US012000396B2

United States Patent

Ito et al.

(12) United States Patent
(10) Patent No.: US 12,000,396 B2
(45) Date of Patent: Jun. 4, 2024

(54) SCROLL COMPRESSOR

(71) Applicant: Mitsubishi Electric Corporation, Tokyo (JP)

(72) Inventors: Masanori Ito, Tokyo (JP); Shuhei Koyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/927,599

(22) PCT Filed: Aug. 20, 2020

(86) PCT No.: PCT/JP2020/031388

§ 371 (c)(1),
(2) Date: Nov. 23, 2022

(87) PCT Pub. No.: WO2022/038730

PCT Pub. Date: Feb. 24, 2022

(65) Prior Publication Data

US 2023/0204032 A1 Jun. 29, 2023

(51) Int. Cl.

| | |
|---|---|
| ***F04C 18/02*** | (2006.01) |
| ***F04C 29/00*** | (2006.01) |
| ***F04C 29/04*** | (2006.01) |

(52) U.S. Cl.

CPC ...... *F04C 18/0261* (2013.01); *F04C 18/0215* (2013.01); *F04C 29/0007* (2013.01); *F04C 29/042* (2013.01); *F05D 2210/14* (2013.01)

(58) Field of Classification Search

CPC .............. F04C 29/0007; F04C 29/0014; F04C 29/042; F04C 18/0207–0292

See application file for complete search history.

(56) References Cited

U.S. PATENT DOCUMENTS

2018/0128270 A1* 5/2018 Koyama .................... F25B 1/10
2020/0271115 A1* 8/2020 Iwatake ................ F04C 29/042

FOREIGN PATENT DOCUMENTS

JP 2001271768 A * 10/2001
WO 2017/126106 A1 7/2017
WO WO-2017126106 A1 * 7/2017 .......... F04C 18/0215

OTHER PUBLICATIONS

International Search Report of the International Searching Authority dated Oct. 6, 2020 for the corresponding international application No. PCT/JP2020/031388 (and English translation).

* cited by examiner

Primary Examiner — Mark A Laurenzi
Assistant Examiner — Xiaoting Hu
(74) *Attorney, Agent, or Firm* — Posz Law Group, PLC

(57) ABSTRACT

A scroll compressor is provided that is configured to increase the amount of refrigerant injected into a target compression chamber to which refrigerant is desired to be injected. The scroll compressor has a fixed scroll that has a first base plate with an injection-pipe connection port to which an injection pipe is connected, a first injection hole that passes through the first base plate and communicates with one of the compression chambers, a communication hole that communicates with the injection-pipe connection port and the first injection hole, a second injection hole that passes through the first base plate and communicates with one of the compression chambers with which the first injection hole communicates, and a groove that is formed in a face opposite to a face on which a first scroll wrap is formed and communicates with the first injection hole and the second injection hole.

5 Claims, 6 Drawing Sheets

Comparative Example

Comparative Example

Comparative Example

SCROLL COMPRESSOR

CROSS REFERENCE TO RELATED APPLICATION

This application is a U.S. national stage application of PCT/JP2020/031388 filed on Aug. 20, 2020, the contents of which are incorporated herein by reference.

TECHNICAL FIELD

The present disclosure relates to a scroll compressor in which refrigerant is injected through an injection hole into a compression chamber.

BACKGROUND ART

Some scroll compressor used for an apparatus such as a variable refrigerant flow system has been proposed in which refrigerant is injected through an injection hole into a compression chamber. By injecting refrigerant through an injection hole into a compression chamber, such a scroll compressor reduces the temperature of the refrigerant discharged from the scroll compressor. A refrigeration cycle circuit that uses such a scroll compressor thus has its improved cooling capacity or its improved heating capacity.

Some scroll compressor in which refrigerant is injected into a compression chamber is disclosed in, for example, Patent Literature 1 (International Publication No. 2017/126106). Patent Literature 1 also discloses, to increase the flow rate of refrigerant injected into the compression chamber, a configuration in which a plurality of injection holes are opened to a single compression chamber and a configuration in which an injection hole is opened with its flat cross section.

CITATION LIST

Patent Literature

Patent Literature 1: International Publication No. 2017/126106

SUMMARY OF INVENTION

Technical Problem

As described above, by injecting refrigerant through an injection hole into a compression chamber, a refrigeration cycle circuit thus has its improved performance. For example, by injecting refrigerant through an injection hole into a compression chamber, a refrigeration cycle circuit thus has its improved coefficient of performance. A coefficient of performance is also referred to as a COP.

In other words, a COP stands for a coefficient of performance. The COP of a refrigeration cycle circuit during cooling operation is a value obtained by dividing its cooling capacity by consumed electric power. Similarly, the COP of a refrigeration cycle circuit during heating operation is a value obtained by dividing its heating capacity by consumed electric power.

To improve the performance of a refrigeration cycle circuit by injecting refrigerant through an injection hole into a compression chamber, factors lie behind the performance improvement, such as the injection hole, the flow rate of refrigerant injected into a compressor, the pressure of refrigerant injected into the compressor, and the pressure in the compression chamber into which refrigerant is injected. These factors are closely related with each other. Among these factors, the injection hole is a factor limited by the geometric form of the compressor.

To improve the performance of a refrigeration cycle circuit by injecting refrigerant through an injection hole into a compression chamber, an increase in flow rate of refrigerant injected into the compression chamber is effective. Then, to increase the flow rate of refrigerant injected into the compression chamber, an increase in size of the injection hole is effective. On the other hand, by combining a scroll wrap of a fixed scroll and a scroll wrap of an orbiting scroll with each other, a scroll compressor has a plurality of compression chambers defined between the scroll wrap of the fixed scroll and the scroll wrap of the orbiting scroll. Also, the injection hole is opened in a base plate of the fixed scroll. Under such conditions, when the size of the injection hole is made excessively large, the injection hole may pass over a portion of the scroll wrap of the orbiting scroll by which compression chambers that are adjacent to each other are divided. As a result, refrigerant leaks though the injection hole from a high-pressure compression chamber into a low-pressure compression chamber. When the size of the injection hole is made excessively large, the scroll compressor thus has its degraded performance, and the refrigeration cycle circuit thus does not have its improved performance.

To solve this problem, the scroll compressor described in Patent Literature 1 has a plurality of injection holes opened to the single compression chamber with no extra increase in size of each of the injection holes, and achieves the increased amount of refrigerant injected into a target compression chamber into which refrigerant is desired to be injected. In some scroll compressor, in a case in which a plurality of injection holes opened to a single compression chamber are to be opened in a base plate of a fixed scroll, these injection holes are opened from a face of the base plate on which a scroll wrap is provided. In addition, a communication hole is opened from a side end of the base plate and made extend in a direction perpendicular to a thickness direction in which a thickness of the base plate extends such that the communication hole communicates with each of the injection holes. In such a scroll compressor, in a case in which a plurality of injection holes opened to a single compression chamber are to be opened in a base plate of a fixed scroll, a problem thus exists in that the configuration of the scroll wrap is limited by the locations of the injection holes and difficulties in manufacture thus may be caused.

In addition, as described above, Patent Literature 1 also discloses a configuration in which the injection hole is opened with its flat cross section to increase the amount of refrigerant injected into a target compression chamber into which refrigerant is desired to be injected. Also in such a configuration, the flat injection hole is, however, opened from a face on which a scroll wrap is provided, the provided scroll wrap thus makes such a flat injection hole hard to be opened, and, similarly to the previous case, difficulties in manufacture of the scroll compressor thus may be caused.

The present disclosure has been made to solve the above problems and is to provide a scroll compressor that is configured to increase the amount of refrigerant injected into a target compression chamber to which refrigerant is desired to be injected, thus has increased performance of a refrigeration cycle circuit, and is more easily manufactured than some scroll compressors.

Solution to Problem

A scroll compressor according to an embodiment of the present disclosure has a fixed scroll having a first base plate in which a discharge port through which refrigerant is discharged is formed, and a first scroll wrap provided on a first face of the first base plate, and an orbiting scroll having a second base plate, and a second scroll wrap provided on a face of the second base plate that faces the fixed scroll, and configured to orbit eccentrically to the fixed scroll, the first scroll wrap and the second scroll wrap being combined with each other and defining compression chambers, the first base plate having an injection-pipe connection port to which an injection pipe is connected, a first injection hole that passes through the first base plate, and communicates with one of the compression chambers before the one of the compression chambers communicates with the discharge port, a communication hole that communicates with the injection-pipe connection port and the first injection hole, at least one second injection hole that passes through the first base plate, and communicates with one of the compression chambers with which the first injection hole communicates, and a groove that is formed in a second face that is a face opposite to the first face, and communicates with the first injection hole and the at least one second injection hole, the scroll compressor being configured to inject, through the first injection hole and the at least one second injection hole, refrigerant supplied to the injection-pipe connection port into the one of the compression chambers before the one of the compression chambers communicates with the discharge port.

Advantageous Effects of Invention

The scroll compressor according to an embodiment of the present disclosure is configured to inject refrigerant through the first injection hole and at least one second injection hole into a single compression chamber before the single compression chamber communicates with the discharge port. The scroll compressor according to an embodiment of the present disclosure is thus configured to increase the amount of refrigerant injected into a target compression chamber to which refrigerant is desired to be injected, and thus improves the performance of the refrigeration cycle circuit. In addition, in the scroll compressor according to an embodiment of the present disclosure, the first injection hole, the second injection hole, and the groove, which communicates with the first injection hole and the second injection hole, are allowed to be opened from the second face, which is opposite to the first face of the first base plate of the fixed scroll, on which the first scroll wrap is provided. The scroll compressor according to an embodiment of the present disclosure is therefore more easily manufactured than some scroll compressor configured to increase the amount of refrigerant injected into a target compression chamber to which refrigerant is desired to be injected and thus improve the performance of the refrigeration cycle circuit.

DESCRIPTION OF EMBODIMENTS

In embodiments below, examples of scroll compressors according to the present disclosure are described with reference to the drawings. Components given the same reference signs in drawings for embodiments are the same or equivalent components. Components described in embodiments below are merely examples of components in the scroll compressor according to the present disclosure. Configurations in the scroll compressor according to the present disclosure are not limited to configurations described in embodiments below.

Embodiment 1

Figure 1:
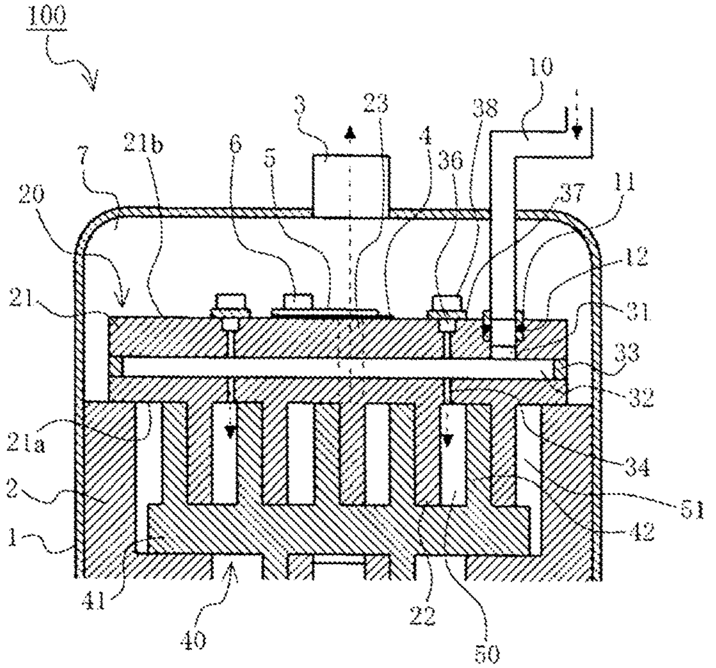
FIG. 1 is a vertical cross-sectional view that schematically illustrates a vicinity of a compression mechanism portion of a scroll compressor according to Embodiment 1.

FIG. 1 is a vertical cross-sectional view that schematically illustrates a vicinity of a compression mechanism portion of a scroll compressor according to Embodiment 1.

A scroll compressor 100 includes a frame 2, a fixed scroll 20, an orbiting scroll 40, and other components. The scroll compressor 100 also includes an airtight container 1 that houses the frame 2, the fixed scroll 20, the orbiting scroll 40, and other components.

The fixed scroll 20 forms, together with the orbiting scroll 40, the compression mechanism portion, which compresses refrigerant. The fixed scroll 20 includes a first base plate 21 and a first scroll wrap 22, which is provided on a first face 21*a* of the first base plate 21. The fixed scroll 20 is fixed to the frame 2. Also, the frame 2 is fixed to the airtight container 1.

The orbiting scroll 40 includes a second base plate 41 and a second scroll wrap 42, which is provided on a face of the second base plate 41 that faces the fixed scroll 20. The orbiting scroll 40 is held at a location between the fixed scroll 20 and the frame 2 such that the orbiting scroll 40 is slidable. The orbiting scroll 40 also orbits eccentrically to the fixed scroll 20 by receiving a driving force transmitted from an unillustrated motor.

The first scroll wrap 22 of the fixed scroll 20 and the second scroll wrap 42 of the orbiting scroll 40 are combined with each other and a compression chamber 50 is thus defined between the first scroll wrap 22 and the second scroll wrap 42. Specifically, a plurality of compression chambers 50 are defined between the first scroll wrap 22 and the second scroll wrap 42. These compression chambers 50 move toward the centers of the first scroll wrap 22 and the second scroll wrap 42 from the outer circumferences of the first scroll wrap 22 and the second scroll wrap 42 through an eccentric orbital motion of the orbiting scroll 40 while the compression chambers 50 reduce their own volume. Also, in the vicinity of outer-circumferential end portions of the first scroll wrap 22 and the second scroll wrap 42, a location between the first scroll wrap 22 and the second scroll wrap 42 serves as a suction port 51 through which refrigerant is sucked. Also, the first base plate 21 of the fixed scroll 20 has a discharge port 23 formed at a location at which the discharge port 23 communicates with a compression chamber 50 that is closest to the centers of the first scroll wrap 22 and the second scroll wrap 42 among the plurality of compression chambers 50.

With this configuration, while the compression chamber 50 is communicating with the suction port 51 and the compression chamber 50 is moving toward the centers of the first scroll wrap 22 and the second scroll wrap 42 from the outer circumferences of the first scroll wrap 22 and the second scroll wrap 42, the compression chamber 50 is sucking low-pressure refrigerant having been introduced into the airtight container 1 into the compression chamber 50. Then, when the compression chamber 50 stops communicating with the suction port 51, the compression chamber 50 keeps moving toward the centers of the first scroll wrap 22 and the second scroll wrap 42 while the compression chamber 50 is compressing the sucked refrigerant. Subsequently, when the compression chamber 50 starts communicating with the discharge port 23, the compression chamber 50 discharges the refrigerant compressed into high pressure from the discharge port 23 into a discharge space 7. The high-pressure refrigerant discharged into the discharge space 7 passes through a discharge pipe 3 provided in the airtight container 1 and flows out to the outside of the scroll compressor 100.

The scroll compressor 100 in Embodiment 1 is also provided with a discharge valve 4 that closes the discharge port 23 such that the discharge port 23 is openable. The discharge valve 4 is fixed to the first base plate 21 by a bolt 6. When the pressure of refrigerant discharged from the discharge port 23 increases to a fixed pressure or higher, the discharge valve 4 elastically deforms such that a location at which the bolt 6 is fixed serves as a fixed end of the discharge valve 4 elastically deforming. Consequently, the discharge port 23 is opened and the refrigerant compressed into high pressure is discharged from the discharge port 23 into the discharge space 7. The scroll compressor 100 in Embodiment 1 is also provided with a discharge-valve presser 5. When the discharge valve 4 elastically deforms, the discharge-valve presser 5 is in contact with the discharge valve 4 and thus prevents the discharge valve 4 from excessively bending. The discharge-valve presser 5 is, together with the discharge valve 4, fixed to the first base plate 21 by the bolt 6.

Some scroll compressor has been proposed in which refrigerant is injected through an injection hole into a compression chamber before the compression chamber starts communicating with a discharge port. Such a scroll compressor has been proposed because, by injecting low-temperature refrigerant to refrigerant having been compressed and of which the temperature is thus increased, the temperature of refrigerant discharged from the scroll compressor is decreased. Also, because refrigerant discharged from a scroll compressor is in a superheated-gas range, as long as the pressure of the refrigerant discharged from the scroll compressor is constant, the lower the temperature of the refrigerant discharged from the scroll compressor decreases, the smaller a difference in enthalpy between a suction port and a discharge port in the scroll compressor reduces, and less work of compression is thus required. With this configuration, the performance of a refrigeration cycle circuit that uses such a scroll compressor is thus improved.

Similarly, the scroll compressor 100 according to Embodiment 1 also has an configuration in which, by use of an injection-pipe connection port 31, communication holes 32, and first injection holes 34 provided in the first base plate 21 of the fixed scroll 20, refrigerant is injected into the compression chamber 50 before the compression chamber 50 communicates with the discharge port 23.

The injection-pipe connection port 31 is a hole that is opened in a second face **21*b* of the first base plate 21 and made extend in a thickness direction of the first base plate 21 in which the first base plate 21 has its thickness. The second face 21*b* is a face of the first base plate 21 that is opposite to the first face 21*a*. The thickness direction of the first base plate 21 is a facing direction of the first face 21*a* and the second face 21*b* in which the first face 21*a* and the second face 21*b* face each other. To this injection-pipe connection port 31, an injection pipe 10 is connected, through which refrigerant to be injected into the compression chamber 50 passes. In Embodiment 1, the injection pipe 10 and the injection-pipe connection port 31 are connected to each other through a joint 11 provided at a distal end of the injection pipe 10. Also, in Embodiment 1, airtightness between the joint 11 and the injection-pipe connection port 31 is improved by an O-ring 12 provided around an outer circumference of the joint 11**.

The first injection holes 34 are each a hole that is opened in the first face **21*a* of the first base plate 21 and has, for example, a circular sectional shape. Specifically, the first injection holes 34 are each opened such that the first injection holes 34 each pass through the first base plate 21. When opening ends of the first injection holes 34 that are located at the first face 21*a* are not closed by a distal end of the second scroll wrap 42 of the orbiting scroll 40, the first injection holes 34 communicate with the compression chamber 50 before the compression chamber 50 communicates with the discharge port 23. When the opening ends of the first injection holes 34 that are located at the first face 21*a* are closed by the distal end of the second scroll wrap 42 of the orbiting scroll 40, the first injection holes 34 do not communicate with the compression chamber 50 before the compression chamber 50 communicates with the discharge port 23. The communication holes 32 communicate the injection-pipe connection port 31 and the first injection holes 34 with each other. These communication holes 32 are each opened from a side end of the first base plate 21 and made extend in a direction perpendicular to the thickness direction of the first base plate 21. Opening ends of the communication holes 32, which are located at the side end of the first base plate 21, are sealed by respective sealing bolts 33**.

Figure 3:
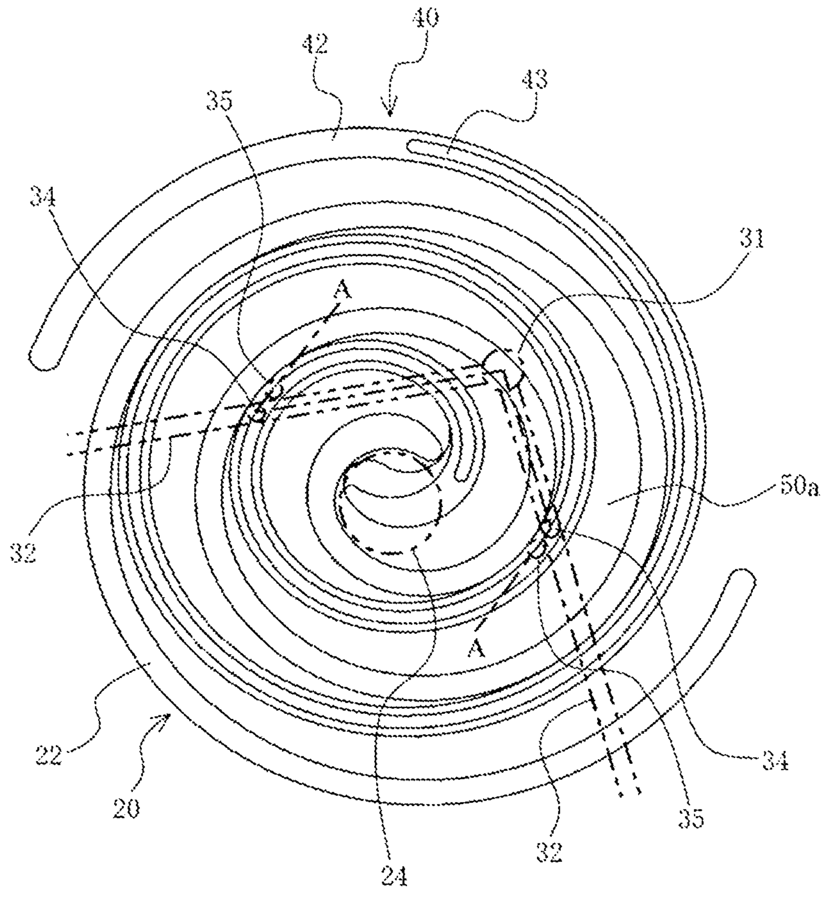
FIG. 3 illustrates the insides of the fixed scroll and an orbiting scroll, which are combined with each other, in the scroll compressor according to Embodiment 1, and the insides are observed from the first base plate of the fixed scroll.

Consequently, refrigerant supplied from the injection pipe 10 to the injection-pipe connection port 31 passes through the communication holes 32 and is supplied to the first injection holes 34. When the opening ends of the first injection holes 34 that are located at the first face **21*a* are not closed by the distal end of the second scroll wrap 42 of the orbiting scroll 40, refrigerant suppled to the first injection holes 34 is injected into the compression chamber 50 before the compression chamber 50 communicates with the discharge port 23. In Embodiment 1, to inject refrigerant into two different compression chambers 50, two respective first injection holes 34 are opened in the first base plate 21 of the fixed scroll 20. Also, to communicate the injection-pipe connection port 31 and each of the first injection holes 34 with each other, as illustrated in FIG. 3 described below, the corresponding one of the two communication holes 32 are opened in the first base plate 21 of the fixed scroll 20**.

Refrigerant is injected into the compression chamber 50 by a difference in pressure between refrigerant to be injected into the compression chamber 50 and the inside of the compression chamber 50. Refrigerant is thus not instantaneously injected into the compression chamber 50 and injection of refrigerant requires a certain amount of time. More work of compression in the scroll compressor 100 is thus required, accordingly. To prevent more work of compression in the scroll compressor 100 caused by late injection of refrigerant into the compression chamber 50, it is thus important to increase the flow rate of refrigerant to be injected into the compression chamber 50 and thus shorten an amount of time required to inject refrigerant into the compression chamber 50. With such a configuration, more work of compression in the scroll compressor 100 is prevented and the performance of the refrigeration cycle circuit that uses the scroll compressor 100 is thus improved.

An optional approach to increase the flow rate of refrigerant injected into the compression chamber 50 may be conceived that the diameters of the first injection holes 34 are to be increased. When the diameters of the first injection holes 34 are excessively increased, the first injection holes 34, however, may overlap a portion of the second scroll wrap 42 of the orbiting scroll 40 by which compression chambers 50 that are adjacent to each other are divided. As a result, refrigerant may leak though the first injection holes 34 from a high-pressure compression chamber 50 into a low-pressure compression chamber 50. When the diameters of the first injection holes 34 are made excessively increased, the scroll compressor 100 thus has its degraded performance, and the refrigeration cycle circuit that uses the scroll compressor 100 thus does not have its improved performance. In Embodiment 1, the diameters of the first injection holes 34 are thus specified as described below.

Figure 2:
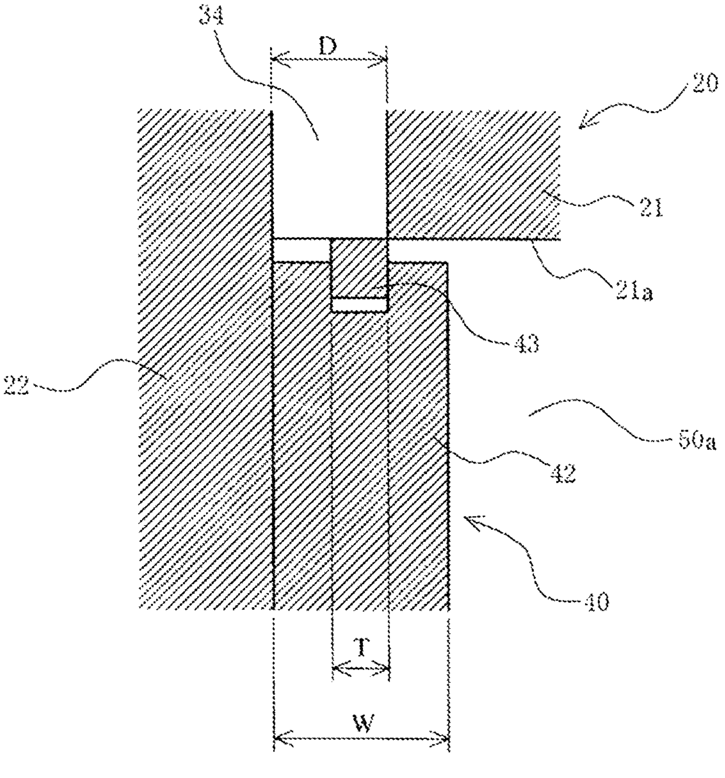
FIG. 2 is a cross-sectional view that illustrates a portion of a vicinity of a first injection hole opened in a first base plate of a fixed scroll in the scroll compressor according to Embodiment 1.

FIG. 2 is a cross-sectional view that illustrates a portion of a vicinity of the first injection hole opened in the first base plate of the fixed scroll in the scroll compressor according to Embodiment 1. FIG. 2 illustrates that the opening end of one of the first injection holes 34 that is located at the first face 21*a* is closed by the distal end of the second scroll wrap 42 of the orbiting scroll 40. Consequently, when, through an eccentric orbital motion of the orbiting scroll 40, the second scroll wrap 42 of the orbiting scroll 40 illustrated in FIG. 2 is away from the first scroll wrap 22 of the fixed scroll 20 illustrated in FIG. 2, refrigerant is injected from the first injection holes 34 into the compression chamber 50 defined between this second scroll wrap 42 and this first scroll wrap 22. In FIG. 2, it is thus not desired to make refrigerant supplied from the first injection hole 34 flow into a compression chamber 50 that is illustrated on the right of the second scroll wrap 42 of the orbiting scroll 40. Hereinafter, such a compression chamber 50 into which it is not desired to make refrigerant supplied from the first injection hole 34 flow is referred to as a compression chamber 50*a*.

As illustrated in FIG. 2, the distal end of the second scroll wrap 42 of the orbiting scroll 40 has a tip seal 43. In Embodiment 1, the first injection hole 34 is prevented from overlapping the compression chamber 50*a* across the tip seal 43 when the opening end of the first injection hole 34 that is located at the first face 21*a* is closed by the distal end of the second scroll wrap 42 of the orbiting scroll 40. With this configuration, refrigerant is prevented from leaking from the first injection hole 34 into the compression chamber 50*a*. To satisfy both this configurational condition and a condition that the diameter of the first injection hole 34 is increased as large as possible, the diameter of the first injection hole 34 is only required to be increased toward the first scroll wrap 22 of the fixed scroll 20.

A specific description is provided below in a case in which the diameter of the first injection hole 34 is defined as D, the width of the tip seal 43 is defined as T, and the tooth width of the second scroll wrap 42 of the orbiting scroll 40 is defined as W. In this case, as long as an equation (1) below is satisfied, refrigerant is prevented from leaking from the first injection hole 34 into the compression chamber 50*a* and the diameter D of the first injection hole 34 is set to the maximum possible diameter.

$$D=\{(W-T)/2\}+T \quad (1)$$

As described above, in a case in which the flow rate of refrigerant to be injected into the compression chamber 50 is desired to be increased, an increase in diameter of the first injection hole 34 is not always feasible because the refrigerant also has to be prevented from leaking from the first injection hole 34 into the compression chamber 50*a*. To solve this problem, the scroll compressor 100 according to Embodiment 1 has an configuration in which, as described below, into a compression chamber 50 into which refrigerant is injected from the first injection hole 34, refrigerant is injected also from a second injection hole 35. Hereinafter, the configuration around the second injection hole 35 is described.

Figure 4:
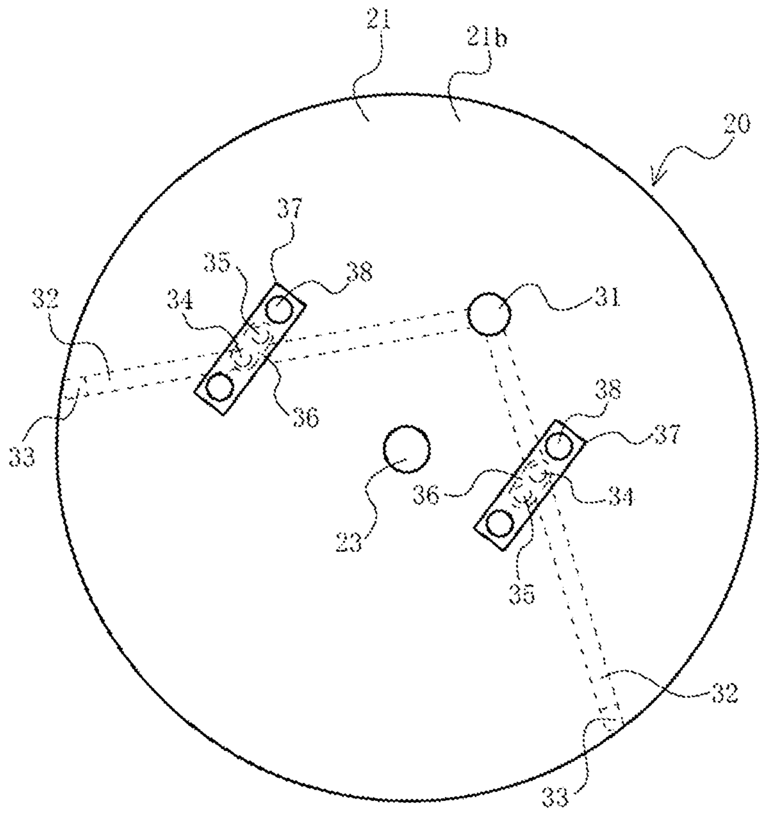
FIG. 4 is a top view that illustrates the fixed scroll in the scroll compressor according to Embodiment 1.
Figure 5:
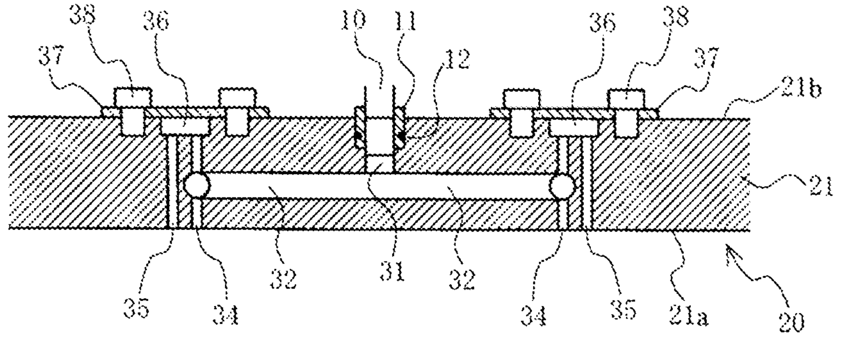
FIG. 5 is a cross-sectional view that illustrates a portion of a vicinity of the first base plate of the fixed scroll in the scroll compressor according to Embodiment 1.

FIG. 3 illustrates the insides of the fixed scroll and the orbiting scroll, which are combined with each other, in the scroll compressor according to Embodiment 1, and the insides are observed from the first base plate of the fixed scroll. FIG. 4 is a top view that illustrates the fixed scroll in the scroll compressor according to Embodiment 1. Also, FIG. 5 is a cross-sectional view that illustrates a portion of a vicinity of the first base plate of the fixed scroll in the scroll compressor according to Embodiment 1. FIG. 5 includes a vertical cross-sectional view that illustrates a location between the injection-pipe connection port 31 and the first injection holes 34 along the communication holes 32. Also, FIG. 5 includes a vertical cross-sectional view that illustrates a location between each of the first injection holes 34 and the corresponding one of the second injection holes 35 along an arrangement direction in which the first injection hole 34 and the corresponding one of the second injection holes 35 are arranged. In other words, FIG. 5 substantially corresponds to cross-sectional views along lines A-A illustrated in FIG. 3. Also, in FIG. 3, the injection-pipe connection port 31, the communication holes 32, the first injection holes 34, and the second injection holes 35 provided in the first base plate 21 of the fixed scroll 20 are illustrated in alternate long and two short dashed lines, which are imaginary lines.

In the first base plate 21 of the fixed scroll 20, in addition to the injection-pipe connection port 31, the communication holes 32, and the first injection holes 34, the second injection holes 35 are opened and grooves 36 are formed. The second injection holes 35 are each opened such that the second injection holes 35 pass through the first base plate 21, and each have, for example, a circular sectional shape. The second injection holes 35 are each opened at a position at which the second injection hole 35 communicates with a compression chamber 50 with which the corresponding one of the first injection holes 34 communicates.

Similarly to the first injection hole 34 described with reference to FIG. 2, the second injection hole 35 is prevented from overlapping the compression chamber 50*a* across the tip seal 43 when an opening end of the second injection hole 35 that is located at the first face 21*a* is closed by the distal end of the second scroll wrap 42 of the orbiting scroll 40. With this configuration, refrigerant is prevented from leaking from the second injection hole 35 into the compression chamber 50*a*.

The grooves 36 are formed in the second face 21*b* of the first base plate 21 of the fixed scroll 20 and each communicate with an end of the corresponding one of the first injection holes 34 that is located at the second face 21*b* and an end of the corresponding one of the second injection holes 35 that is located at the second face 21*b* with each other. Consequently, refrigerant supplied from the injection pipe 10 to the injection-pipe connection port 31 passes through the communication holes 32 and is supplied to the first injection hole 34. Part of refrigerant supplied to the first injection hole 34 then passes through the groove 36 and is supplied to the second injection hole 35. When the opening end of the first injection hole 34 and the opening end of the second injection hole 35 that are located at the first face 21*a* are not closed by the distal end of the second scroll wrap 42 of the orbiting scroll 40, refrigerant is injected from both the first injection hole 34 and the second injection hole 35 into a single compression chamber 50 before the single compression chamber 50 communicates with the discharge port 23. With this configuration, the flow rate of refrigerant injected into the compression chamber 50 is further increased.

When refrigerant supplied from the first injection holes 34 into the grooves 36 is then to be supplied into the second injection holes 35, opening ends of the grooves 36, which are located at the second face 21*b*, have to be closed and the refrigerant supplied from the first injection holes 34 into the grooves 36 is thus prevented from leaking into the discharge space 7. An approach to close the opening ends of the grooves 36, which are located at the second face 21*b*, is not particularly limited. In Embodiment 1, by fixing covers 37, which cover the opening ends of the grooves 36, which are located at the second face 21*b*, to the first base plate 21 by bolts 38, the opening ends of the grooves 36, which are located at the second face 21*b*, are closed. In Embodiment 1, as described above, to inject refrigerant into two different compression chambers 50, two respective first injection holes 34 are opened in the first base plate 21 of the fixed scroll 20. Because the second injection holes 35 are also used to inject refrigerant into two different compression chambers 50, to correspond the two first injection holes 34, two respective second injection holes 35 are also opened in the first base plate 21 of the fixed scroll 20.

A portion of the first scroll wrap 22 of the fixed scroll 20 is shaped in an involute curve of a base circle 24. Specifically, such a shape in an involute curve of the base circle 24 is applied to at least a portion of the first scroll wrap 22 that serves as an outer wall of a compression chamber 50 into which refrigerant is injected from the corresponding one of the first injection holes 34 and the corresponding one of the second injection holes 35. The first injection holes 34 and the second injection holes 35 are then arranged on an injection curve of the base circle 24, which coincides with a base circle of an involute curve in which the portion of the first scroll wrap 22 is shaped. With this configuration, in a case in which the first injection holes 34 and the second injection holes 35 each have a circular sectional shape, the distance between the center of each of the first injection holes 34 and the first scroll wrap 22 is the same as the distance between the center of the corresponding one of the second injection holes 35 and the first scroll wrap 22. With this configuration, both diameters of the first injection holes 34 and the second injection holes 35 are each specified to the maximum possible diameter illustrated in FIG. 2. Consequently, the flow rate of refrigerant injected from the first injection holes 34 and the second injection holes 35 into the compression chamber 50 is further increased.

Figure 6:
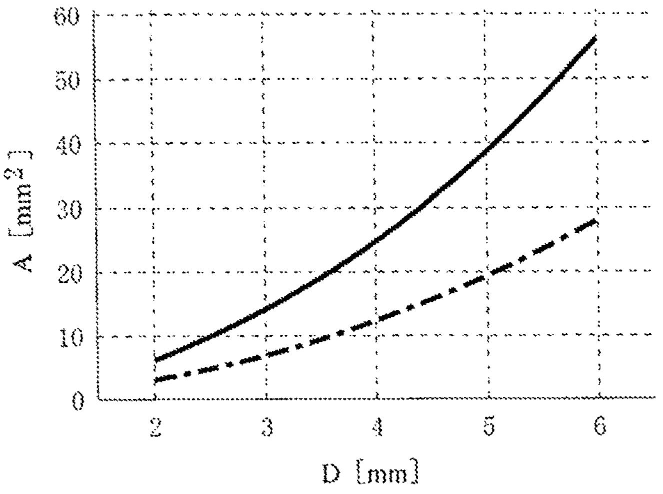
FIG. 6 is a graph that illustrates that the scroll compressor according to Embodiment 1 is configured to increase the amount of injected refrigerant.

FIG. 6 is a graph that illustrates that the scroll compressor according to Embodiment 1 is configured to increase the amount of injected refrigerant. A horizontal axis illustrated in FIG. 6 represents the diameter of an injection hole. Also, a vertical axis illustrated in FIG. 6 represents an opening area of the injection hole, which is an area in which the injection hole is opened to the compression chamber 50. Also, an alternate long and short dashed line illustrated in FIG. 6 represents a case in which only the first injection holes 34 are each provided to the scroll compressor 100. Also, a solid line illustrated in FIG. 6 represents a case in which both the first injection holes 34 and the second injection holes 35 are each provided to the scroll compressor 100. FIG. 6 illustrates a case in which the diameter of each of the first injection holes 34 is the same as the diameter of the corresponding one of the second injection holes 35.

In a case in which only the first injection holes 34 are each provided to the scroll compressor 100, the opening area of the injection hole, which is opened to the compression chamber 50, is only an opening area of each of the first injection holes 34. In contrast, in a case in which both the first injection holes 34 and the second injection holes 35 are each provided to the scroll compressor 100, the opening area of the injection hole, which is opened to the compression chamber 50, is the sum of an opening area of each of the first injection holes 34 and an opening area of the corresponding one of the second injection holes 35. As illustrated in FIG. 6, in a case in which both the first injection holes 34 and the second injection holes 35 are each provided to the scroll compressor 100, the opening area of the injection hole, which is opened to the compression chamber 50, is thus larger than the opening area in a case in which only the first injection holes 34 are each provided to the scroll compressor 100. The larger the opening area of the injection hole, which is opened to the compression chamber 50, is increased, the higher the flow rate of refrigerant injected into the compression chamber 50 is increased. In this aspect as well, it is obvious that, in a case in which both the first injection holes 34 and the second injection holes 35 are each provided to the scroll compressor 100, the flow rate of refrigerant injected into the compression chamber 50 is increased.

The scroll compressor 100 with this configuration prevents refrigerant that is supplied from the first injection holes 34 and the second injection holes 35 and is prepare to be injected from leaking into the compression chamber 50*a*, which is a compression chamber 50 into which refrigerant is not supposed to be injected, and thus increases the amount of refrigerant injected into a target compression chamber 50 into which refrigerant is desired to be injected. The performance of the refrigeration cycle circuit that uses the scroll compressor 100 is therefore improved.

Also, by use of the scroll compressor 100 with such high efficiency, an evaporator in the refrigeration cycle circuit has a large difference in enthalpy. Also, by use of the scroll compressor 100 with such high efficiency, a less amount of refrigerant is required to circulate in the refrigeration cycle circuit and the scroll compressor 100 thus has its less theoretical discharge capacity. For this reason, the scroll compressor 100 may be downsized and the scroll compressor 100 thus reduces its mechanical loss. In these aspects as well, the performance of the refrigeration cycle circuit that uses the scroll compressor 100 is therefore improved.

Also, in Embodiment 1, the first injection holes 34 and the second injection holes 35 are arranged on the injection curve of the base circle 24, which coincides with a base circle of an involute curve in which the portion of the first scroll wrap 22 is shaped. For this reason, the scroll compressor 100 according to Embodiment 1, as described above, further increases the flow rate of refrigerant injected into the compression chamber 50. The performance of the refrigeration cycle circuit that uses the scroll compressor 100 according to Embodiment 1 is therefore further improved.

A type of refrigerant used in the scroll compressor 100 according to Embodiment 1 is not particularly limited. The refrigerant is not limited to an HCFC refrigerant, such as R22. An HFC-based refrigerant, an HC-based refrigerant, or a natural refrigerant may be used in the scroll compressor 100. Use of an HFC-based refrigerant, an HC-based refrigerant, or a natural refrigerant in the scroll compressor 100 contributes to prevention of ozone layer depletion and prevention of global warming.

The scroll compressor 100 with such a configuration described in Embodiment 1 obtains following advantageous effects in comparison to a scroll compressor 200 according to a comparative example, which is described below.

Figure 7:
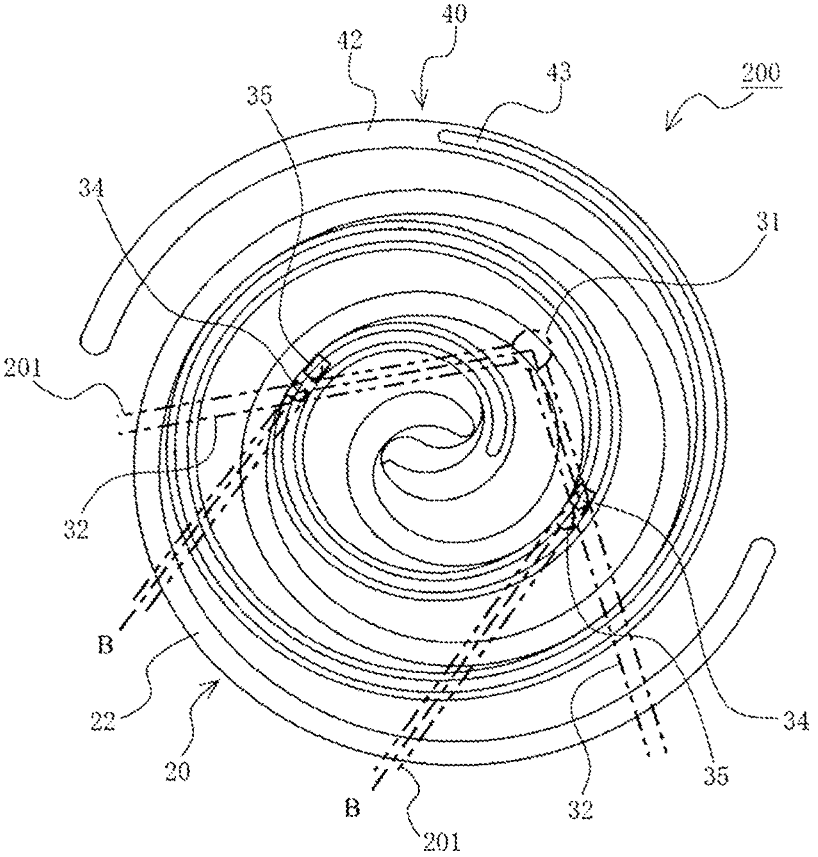
FIG. 7 illustrates the insides of a fixed scroll and an orbiting scroll, which are combined with each other, in a scroll compressor according to a comparative example, and the insides are observed from a first base plate of the fixed scroll.
Figure 8:
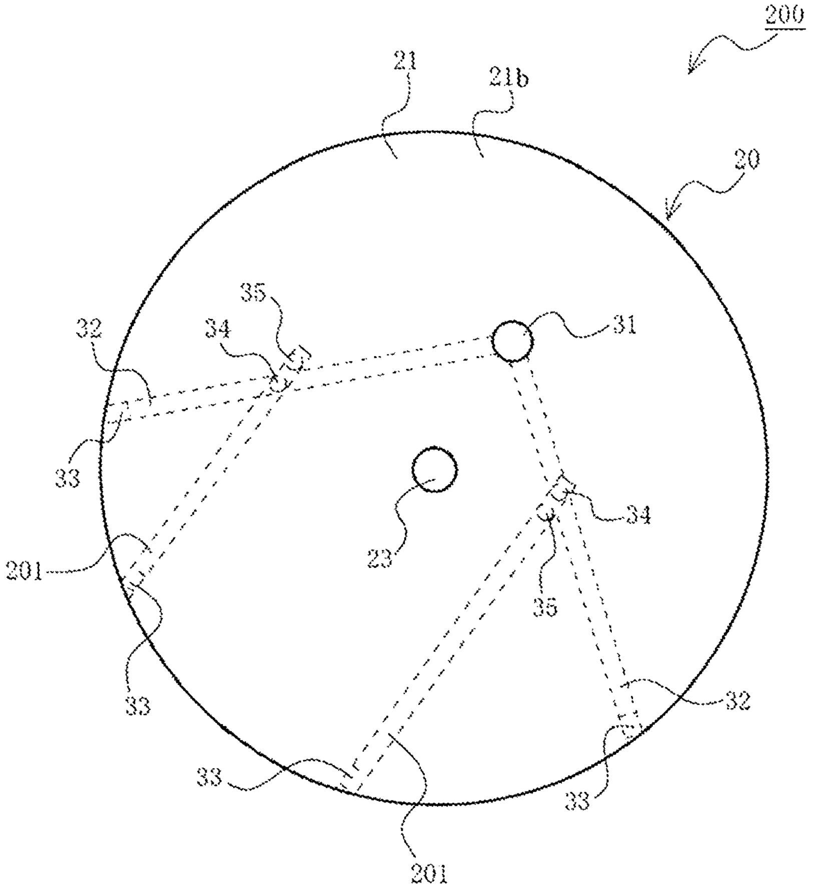
FIG. 8 is a top view that illustrates the fixed scroll in the scroll compressor according to the comparative example, and the fixed scroll is observed in the same direction in which the fixed scroll illustrated in FIG. 4 is observed.
Figure 9:
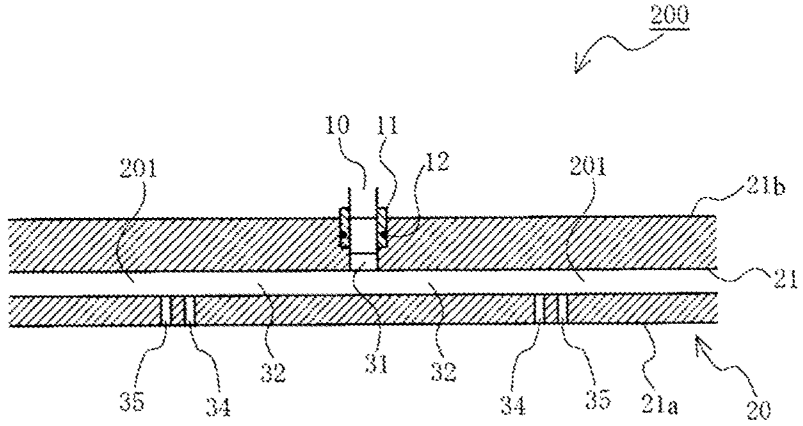
FIG. 9 is a cross-sectional view that illustrates a portion of a vicinity of the first base plate of the fixed scroll in the scroll compressor according to the comparative example.

FIG. 7 illustrates the insides of a fixed scroll and an orbiting scroll, which are combined with each other, in a scroll compressor according to the comparative example, and the insides are observed from a first base plate of the fixed scroll. FIG. 8 is a top view that illustrates the fixed scroll in the scroll compressor according to the comparative example, and the fixed scroll is observed in the same direction in which the fixed scroll illustrated in FIG. 4 is observed. Also, FIG. 9 is a cross-sectional view that illustrates a portion of a vicinity of the first base plate of the fixed scroll in the scroll compressor according to the comparative example. FIG. 9 includes a vertical cross-sectional view that illustrates a location between the injection-pipe connection port 31 and the first injection holes 34 along the communication holes 32. Also, FIG. 9 includes a vertical cross-sectional view that illustrates a location between each of the first injection holes 34 and the corresponding one of the second injection holes 35 along an arrangement direction in which the first injection hole 34 and the corresponding one of the second injection holes 35 are arranged. In other words, FIG. 9 substantially corresponds to cross-sectional views along lines B-B illustrated in FIG. 7. Also, in FIG. 7, the injection-pipe connection port 31, the communication holes 32, the first injection holes 34, the second injection holes 35, and communication holes 201 provided in the first base plate 21 of the fixed scroll 20 of the scroll compressor 200 according to the comparative example are illustrated in alternate long and two short dashed lines, which are imaginary lines.

In the scroll compressor 200 according to the comparative example, the first injection holes 34 and the second injection holes 35 are opened by a related-art technique and each of the first injection holes 34 and the corresponding one of the second injection holes 35 are communicated with each other by a related-art technique.

Specifically, in a case in which the first injection holes 34 and the second injection holes 35 are opened by a related-art technique, the first injection holes 34 and the second injection holes 35 are opened from the first face 21*a* of the first base plate 21, on which the first scroll wrap 22 is provided. Also, in a case in which each of the first injection holes 34 and the corresponding one of the second injection holes 35 are communicated with each other by a related-art technique, the communication holes 201 are each opened from the side end of the first base plate 21 in a direction perpendicular to the thickness direction of the first base plate 21 and each of the first injection holes 34 and the corresponding one of the second injection holes 35 are then communicated with each other by the corresponding one of the communication holes 201. Consequently, in the scroll compressor 200 according to the comparative example, a problem thus exists in that the configuration of the first scroll wrap 22 is limited by locations at which the first injection holes 34 and the second injection holes 35 are opened and difficulties in manufacture thus may be caused.

In contrast, in the scroll compressor 100 according to Embodiment 1, the first injection holes 34, the second injection holes 35, and the grooves 36 are allowed to be opened from the second face 21*b*, which is opposite to the first face 21*a* of the first base plate 21 of the fixed scroll 20, on which the first scroll wrap 22 is provided. In the scroll compressor 100 in Embodiment 1, in comparison to the scroll compressor 200 according to the comparative example, the configuration of the first scroll wrap 22 is thus less limited. The scroll compressor 100 in Embodiment 1, in comparison to the scroll compressor 200 according to the comparative example, is thus more easily manufactured. In other words, the scroll compressor 100 according to Embodiment 1 is more easily manufactured than some scroll compressor configured to increase the amount of refrigerant injected into a target compression chamber to which refrigerant is desired to be injected and thus improve the performance of the refrigeration cycle circuit. Also, in addition to such an advantageous effect that the scroll compressor 100 according to Embodiment 1 is more easily manufactured than some scroll compressor configured to increase the amount of refrigerant injected into a target compression chamber to which refrigerant is desired to be injected and thus improve the performance of the refrigeration cycle circuit, the communication holes 201 does not have to be opened, and manufacturing costs are thus reduced.

In the scroll compressor 200 according to the comparative example, when refrigerant is not injected into the compression chamber 50, the capacity in the communication holes 201 is an invalid capacity, which is not involved in compression of refrigerant that circulates in a refrigeration cycle. The performance of the scroll compressor 200 according to the comparative example, when refrigerant is not injected into the compression chamber 50, is thus degraded by wasteful work of compression of refrigerant that stagnates in the communication holes 201. In contrast, the performance of the scroll compressor 100 according to Embodiment 1, in which no communication holes 201 are required, when refrigerant is not injected into the compression chamber 50, further improves than the performance of the scroll compressor 200 according to the comparative example.

As described above, the scroll compressor 100 according to Embodiment 1 includes the fixed scroll 20 and the orbiting scroll 40. The fixed scroll 20 includes the first base plate 21, in which the discharge port 23 through which refrigerant is discharged is formed, and the first scroll wrap 22, which is provided on the first face 21*a* of the first base plate 21. The orbiting scroll 40 includes the second base plate 41 and the second scroll wrap 42, which is provided on a face of the second base plate 41 that faces the fixed scroll 20. The first scroll wrap 22 and the second scroll wrap 42 are combined with each other and the compression chambers 50 are thus defined. The orbiting scroll 40 orbits eccentrically to the fixed scroll 20. In the first base plate 21, the injection-pipe connection port 31, the first injection holes 34, the communication holes 32, the second injection holes 35, and the grooves 36 are provided. To the injection-pipe connection port 31, the injection pipe 10 is connected. The first injection holes 34 pass through the first base plate 21 and communicate with one of the compression chambers 50 before the one of the compression chambers 50 communicates with the discharge port 23. The communication holes 32 each communicate the injection-pipe connection port 31 and the corresponding one of the first injection holes 34 with each other. The second injection holes 35 pass through the first base plate 21 and each communicate with one of the compression chambers 50 with which the corresponding one of the first injection holes 34 communicates. The grooves 36 are formed in the second face 21*b* and each communicate with the corresponding one of the first injection holes 34 and the corresponding one of the second injection holes 35. In the scroll compressor 100 according to Embodiment 1, refrigerant supplied into the injection-pipe connection port 31 is injected from each of the first injection holes 34 and the corresponding one of the second injection holes 35 into the one of the compression chambers 50 before the one of the compression chambers 50 communicates with the discharge port 23.

The scroll compressor 100 with such a configuration is, as described above, therefore more easily manufactured than some scroll compressor configured to increase the amount of refrigerant injected into a target compression chamber to which refrigerant is desired to be injected and thus improve the performance of the refrigeration cycle circuit.

Embodiment 2

In Embodiment 1, when one of the first injection holes 34 is focused, one of the second injection holes 35 communicates with a compression chamber 50 with which the one of the first injection holes 34 communicates. The number of the second injection holes 35 in this case is not limited to one. A plurality of second injection holes 35 may communicate with a compression chamber 50 with which one of the first injection holes 34 communicates. Description not provided in particular in Embodiment 2 is the same as Embodiment 1. Description in Embodiment 2 is provided such that functions and components that are the same as Embodiment 1 have the same reference signs.

Figure 10:
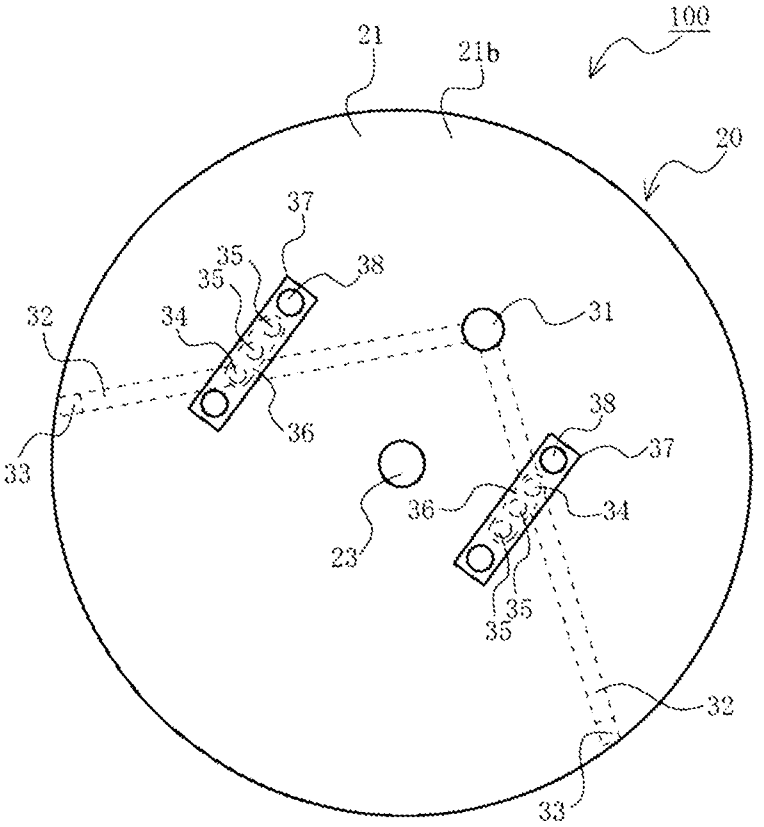
FIG. 10 is a top view that illustrates a fixed scroll in a scroll compressor according to Embodiment 2, and the fixed scroll is observed in the same direction in which the fixed scroll illustrated in FIG. 4 is observed.

FIG. 10 is a top view that illustrates a fixed scroll in a scroll compressor according to Embodiment 2, and the fixed scroll is observed in the same direction in which the fixed scroll illustrated in FIG. 4 is observed.

In the scroll compressor 100 according to Embodiment 2, when one of the first injection holes 34 is focused, a plurality of second injection holes 35 are opened and communicate with a compression chamber 50 with which the one of the first injection holes 34 communicates. FIG. 10 illustrates an example of the scroll compressor 100 in which two of the second injection holes 35 communicate with a compression chamber 50 with which one of the first injection holes 34 communicates. In the scroll compressor 100 in Embodiment 2, similarly to the scroll compressor 100 in Embodiment 1, to inject refrigerant into two different compression chambers 50, two respective first injection holes 34 are opened in the first base plate 21 of the fixed scroll 20. In such a case, a plurality of second injection holes 35 communicate with a compression chamber 50 with which each of the first injection holes 34 communicates.

In a case in which the first base plate 21 of the fixed scroll 20 is thick enough to allow the communication holes 32 to be opened that are each thick enough to cause refrigerant to be injected from a plurality of second injection holes 35, a plurality of second injection holes 35 that communicate with a compression chamber 50 with which one of the first injection holes 34 communicates may be opened in the first base plate 21 of the fixed scroll 20. In other words, a plurality of second injection holes 35 may communicate with one of the grooves 36. The flow rate of refrigerant injected into the compression chamber 50 is thus further increased and the performance of the refrigeration cycle circuit that uses the scroll compressor 100 is therefore improved.

REFERENCE SIGNS LIST

1: airtight container, 2: frame, 3: discharge pipe, 4: discharge valve, 5: discharge-valve presser, 6: bolt, 7: discharge space, 10: injection pipe, 11: joint, 12: O-ring, 20: fixed scroll, 21: first base plate, 21*a*: first face, 21*b*: second face, 22: first scroll wrap, 23: discharge port, 24: base circle, 31: injection-pipe connection port, 32: communication hole, 33: sealing bolt, 34: first injection hole, 35: second injection hole, 36: groove, 37: cover, 38: bolt, 40: orbiting scroll, 41: second base plate, 42: second scroll wrap, 43: tip seal, 50: compression chamber, 51: suction port, 100: scroll compressor, 200: scroll compressor (comparative example), 201: communication hole

The invention claimed is:

1. A scroll compressor comprising:

a fixed scroll having a first base plate in which a discharge port through which refrigerant is discharged is formed, and a first scroll wrap provided on a first face of the first base plate; and an orbiting scroll having a second base plate, and a second scroll wrap provided on a face of the second base plate that faces the fixed scroll, and configured to orbit eccentrically to the fixed scroll, the first scroll wrap and the second scroll wrap being combined with each other and defining compression chambers, the first base plate having an injection-pipe connection port to which an injection pipe is connected, a first injection hole that passes through the first base plate, and communicates with one of the compression chambers before the one of the compression chambers communicates with the discharge port, a communication hole that communicates with the injection-pipe connection port and the first injection hole, at least one second injection hole that passes through the first base plate, and communicates with the one of the compression chambers with which the first injection hole communicates, and a groove that is formed in a second face that is a face opposite to the first face, and communicates with the first injection hole and the at least one second injection hole, the scroll compressor being configured to inject, through the first injection hole and the at least one second injection hole, refrigerant supplied to the injection-pipe connection port into the one of the compression chambers before the one of the compression chambers communicates with the discharge port, wherein the communication hole is configured to communicate with the at least one second injection hole via the first injection hole.

2. The scroll compressor of claim 1, wherein the at least one second injection hole comprises a plurality of second injection holes opened in the first base plate.

3. The scroll compressor of claim 1, wherein the refrigerant that is used comprises an HFC-based refrigerant, an HC-based refrigerant, or a natural refrigerant.

4. The scroll compressor of claim 1, wherein the first scroll wrap has a portion that is shaped in an involute curve, and the first injection hole and the at least one second injection hole are located on an injection curve of a base circle that coincides with a base circle of the involute curve in which the portion of the first scroll wrap is shaped.

5. A scroll compressor comprising:

a fixed scroll having a first base plate in which a discharge port through which refrigerant is discharged is formed, and a first scroll wrap provided on a first face of the first base plate; and an orbiting scroll having a second base plate, and a second scroll wrap provided on a face of the second base plate that faces the fixed scroll, and configured to orbit eccentrically to the fixed scroll, the first scroll wrap and the second scroll wrap being combined with each other and defining compression chambers, the first base plate having an injection-pipe connection port to which an injection pipe is connected, a first injection hole that passes through the first base plate, and communicates with one of the compression chambers before the one of the compression chambers communicates with the discharge port, a communication hole that communicates with the injection-pipe connection port and the first injection hole, at least one second injection hole that passes through the first base plate, and communicates with the one of the compression chambers with which the first injection hole communicates, and a groove that is formed in a second face that is a face opposite to the first face, and communicates with the first injection hole and the at least one second injection hole, the scroll compressor being configured to inject, through the first injection hole and the at least one second injection hole, refrigerant supplied to the injection-pipe connection port into the one of the compression chambers before the one of the compression chambers communicates with the discharge port, wherein a distal end of the second scroll wrap has a tip seal, D denotes a diameter of the first injection hole, W denotes a tooth width of the second scroll wrap, T denotes a width of the tip seal, and the diameter of the first injection hole is set such that $D=\{(W-T)/2\}+T$.

* * * * *